United States Patent Office 3,197,485
Patented July 27, 1965

3,197,485
INTERMEDIATES IN SYNTHESIS OF
PREGNADIENE
Wataru Nagata, Hyogo Prefecture, Japan, assignor to
Shionogi & Co., Ltd., Osaka, Japan
No Drawing. Filed July 18, 1962, Ser. No. 210,842
Claims priority, application Japan, Mar. 12, 1960, 35/
8,208; Mar. 19, 1960, 35/9,421; Apr. 4, 1960, 35/
20,124, 35/20,125; Apr. 6, 1960, 35/20,723; Apr. 21,
1960, 35/22,417; Apr. 25, 1960, 35/22,611; July 19,
1961, 36/25,986
18 Claims. (Cl. 260—340.9)

This application is a continuation-in-part of copending application Serial No. 127,097, filed July 27, 1961.

This invention relates to the synthesis of the pregnadiene represented by the following formula:

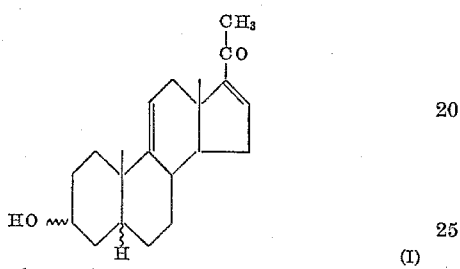

wherein the ripple mark (⌇) is a generic indication of both the α- and β-configurations, and to intermediates useful in such synthesis.

The pregnadiene I is useful as an intermediate in the synthesis of pharmacologically active steroids such as cortisone, hydrocortisone, prednisolone and dexamethasone. Accordingly, a primary object of this invention is to provide a useful compound for the synthesis of pharmacologically active steroids and intermediates thereof. Another object of this invention is to provide a synthetic method for the preparation of pharmacologically active steroids. A further object of the invention is to provide a novel total synthetic method for the production of steroids of pregnane series. Other objects will be apparent to those skilled in the art to which this invention pertains.

The position-numbering employed herein for the steroidal type compounds is that generally accepted in steroid chemistry, i.e.,

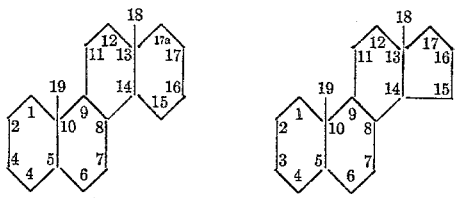

unless some other numbering is specially mentioned.

The method of this invention is generically outlined in the following reaction scheme:

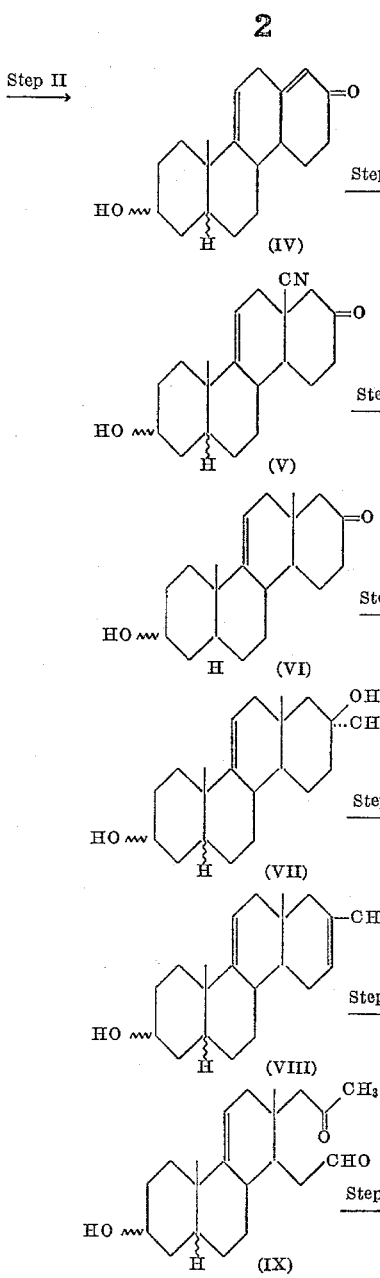

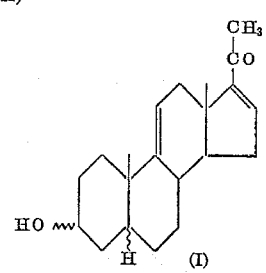

wherein the ripple mark (⌇) is a generic indication of both the α- and β-configurations. In this connection, it should be understood that the reaction scheme shows the substantial order of the steps in the method of this invention, modifications and equivalents—including possible detours—being omitted. Thus, any hydroxy and/or oxo radicals in the disclosed compounds are intended also to represent such radicals properly protected, when necessary, although—for the sake of simplicity—such radicals are shown only in unprotected form in the reaction scheme. In other words, the showing of an hydroxyl radical is intended to represent a free hydroxyl or a protected hydroxyl such as acylated hydroxyl, preferably a lower alkanoyloxy (e.g., acetyloxy, propanoyloxy, butanoyloxy), a benzoyloxy or a lower alkylbenzoyloxy (e.g., tolylcarbonyloxy, xylylcarbonyloxy), and the showing of an oxo radical is intended to represent a free oxo or a protected oxo such as ketalized oxo, preferably a lower alkylenedioxy (e.g., ethylenedioxy, propylenedioxy).

The starting material of the present invention is 3-hydroxy-D-homo-18-nor-androst-13(17a)-en-17-one of Formula II, i.e., 3α-hydroxy-D-homo-18-nor-5α-androst-13(17a)-en-17-one of Formula IIa, 3α-hydroxy-D-homo-18-nor-5β-androst-13(17a)-en-17-one of Formula IIb, 3β-hydroxy-D-homo-18-nor-5α-androst-13(17a)-en-17-one of Formula IIc and 3β-hydroxy-D-homo-18-nor-5β-androst-13(17a)-en-17-one of Formula IId. The $\Delta^{13}$-enone II, which is described and claimed in my copending application, Serial No. 127,097, filed July 27, 1961, can be prepared by refluxing mildly 6-methoxy-2-tetralone of Formula A with an equimolar amount of β-diethylaminoethyl ethyl ketone in anhydrous ether in the presence of sodium hydride, reacting the resultant mixture containing a tautomer of 1-methyl-7-methoxy-1,2,3,3,9,10-hexahydrophenanthren-2-one of Formula B with an equimolar amount of β-diethylaminoethyl methyl ketone at about 0 to 5° C. followed by refluxing, and subjecting the thus-obtained 2-methoxy-10a-methyl-5,6,8,9,10,10a,11,12-octahydrochrysen-8-one of Formula C to reduction in a variety of per se conventional manners. These steps are representable by the following scheme:

The method of this invention substantially comprises eight steps, i.e., double bond formation (Step I), movement of double bond (Step II), angular cyanation (Step III), conversion of angular cyano group into angular methyl group (Step IV), methylation (Step V), dehydration (Step VI), oxidative ring fission (Step VII) and cyclization (Step VIII), these being hereinafter illustrated step by step. Intervening among these steps, there may be necessary to execute the protection of the hydroxyl radical and/or the oxo radical in a per se conventional manner. However, whether the protection is necessary or not may be obvious to those skilled in the art. The hydroxyl radical is usually protected by acylation, which can be carried out by treating the hydroxyl compound with an acylating agent in the presence of a condensing agent. For instance, the hydroxyl compound may be converted into the corresponding acetoxy compound by treating with acetic anhydride in the presence of pyridine or p-toluenesulfonic acid. Subsequent deacylation, if desired, can be easily carried out by treatment of the acyloxy compound with alkali, usually while heating. The procedure generally employed for protecting an oxo radical is ketalation, which can be realized by treatment of an oxo compound with an alcohol in the presence of a condensing agent. For instance, the ketalation may be carried out by heating the oxo compound with ethanol or ethyleneglycol in the presence of p-toluenesulfonic acid in an organic solvent medium such as benzene or toluene. Subsequent deketalation, if desired, can be easily carried out by heating the ketaolized compound with acid. Some of these reactions, i.e., acylation, deacylation, ketalation and deketalation, may proceed simultaneously with the main reaction in some steps.

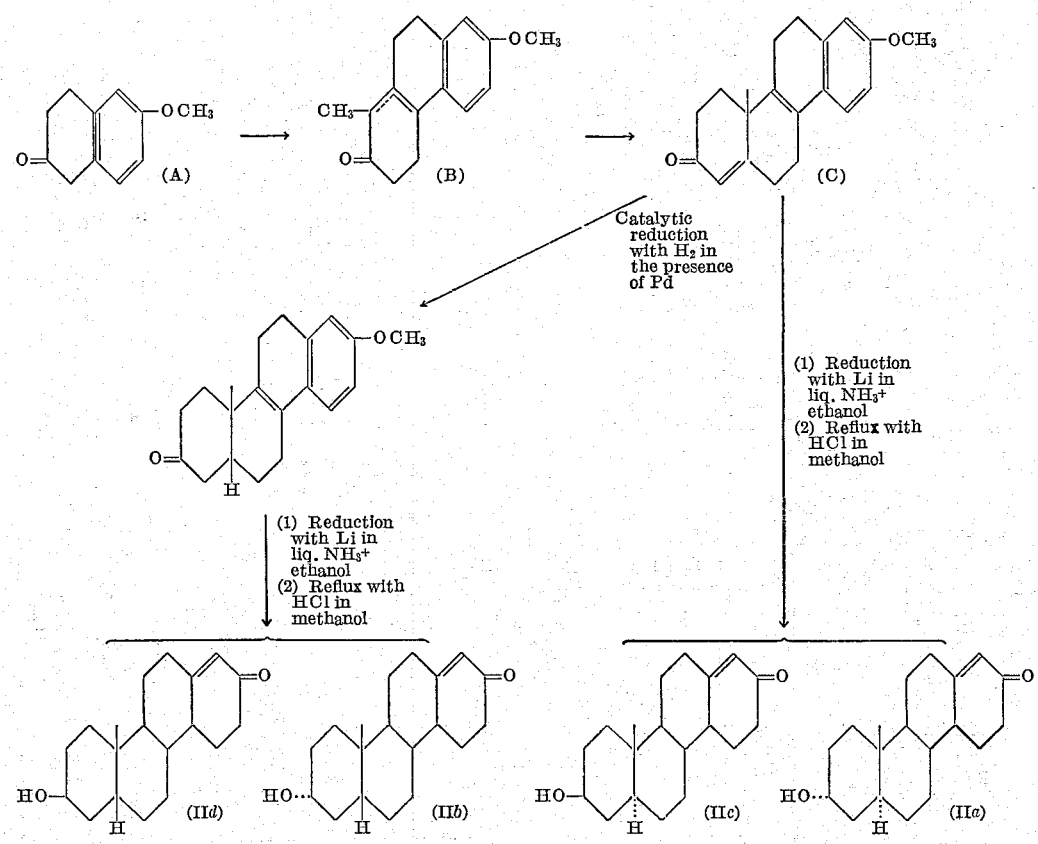

The separation of the pregnadiene II (IIa, IIb, IIc or IId) from its isomeric mixture can be readily accomplished by a conventional procedure (e.g., chromatography).

Firstly, the starting $\Delta^{13}$-enone II is subjected to double bond formation comprising enolation, halogenation and dehalogenation to give the $\Delta^{11,13}$-dienone III. The enolation may be attained by a conventional enolesterification or enoletherification procedure. For instance, the enolesterification can be accomplished by refluxing the Δ¹³-enone II with a mixture of isopropenyl acylate (e.g., isopropenyl acetate, isopropenyl proprionate) and an acid (e.g., sulfuric acid, p-toluenesulfonic acid) and the enoletherification accomplished by refluxing the Δ¹³-enone II with alkyl orthoformate (e.g., methyl orthoformate, ethyl orthoformate) in the presence of a basic substance (e.g., pyridine, picoline, triethylamine) in an inert solvent (e.g., methanol, ethanol, benzene, toluene). The subsequent halogenation and dehalogenation can be performed by treating the resulting enolated compound with a halogenating agent, preferably a brominating agent (e.g., bromine, N-bromosuccinic imide) in an inert solvent (e.g., acetic acid, collidine), followed by treatment of the resulting halogenated substance with lithium bromide and lithium carbonate in an inert solvent (e.g., dimethylformamide, ether) while refluxing.

Secondly, the Δ¹¹,¹³-dienone III is subjected to movement of double bond comprising enolation and hydrolysis to give Δ⁹,¹³-dienone IV. Although the enolation may be carried out in the same manner as in Step I, the enoletherification is preferably adopted, because the elimination of the enolether group in the following hydrolysis can be accomplished under a relatively mild condition. The hydrolysis is preferred to be carried out under a mild condition, i.e., by treating the enolated compound with a weak acid (e.g., acetic acid) at about 70 to 100° C.

Thirdly, the Δ⁹,¹³-dienone IV is subjected to angular cyanation to give the nitrile V. The cyanation may be carried out according to a novel angular cyanation procedure, which is described and claimed in my copending application, Serial No. 127,097, filed July 27, 1961. Thus, the reaction can be performed by treating the Δ⁹,¹³-dienone IV with a cyanating agent (e.g., alkali metal cyanide, alkaline earth metal cyanide, lithium aluminum cyanide, cyanomagnesium halide alkylaluminum cyanide, cyanoalkylaluminum halide), preferably in the presence of a catalyst (e.g., ammonium halide, acetic acid, ammonium acetate, alkali bisulfite), in an inert organic solvent (e.g., lower alkanol, ether, hydrocarbon, dialkylformamide, dioxane, tetrahydrofuran) at about 20 to 100° C. More preferably, Lewis acids or suitably bases (e.g., trialkylamine, aluminum trialkoxide, alkylaluminum alkoxide, trialkylaluminum, alkylaluminum halide) may be used in combination with hydrocyanic acid in an inert organic solvent as described above except lower alkanol.

Fourthly, the angular cyano group of the nitrile V is converted into the methyl group. The conversion comprises reduction, hydrolysis and reduction. The first reduction can be accomplished by treating the nitrile V with a metal hydride (e.g., lithium aluminum hydride, sodium aluminum hydride, magnesium aluminum hydride, aluminum hydride, lithium aluminum alkoxyhydride) in an inert organic solvent (e.g., tetrahydrofuran, ether) at a temperature not lower than room temperature. The following hydrolysis may be carried out by treating the resulting reduction product with alkali (e.g., sodium hydroxide, potassium hydroxide) while refluxing. The second reduction may be accomplished by converting the above-prepared hydrolyzing product into the semicarbazone, hydrazone, or azine in a per se conventional manner and heating the latter with a basic catalyst (e.g., sodium, sodium methoxide, sodium ethoxide, sodium hydroxide, potassium hydroxide) in the presence or absence of an inert organic solvent (e.g., methanol, ethanol, diethyleneglycol, triethyleneglycol).

Fifthly, the thus-prepared Δ⁹-enone VI is subjected to methylation at 17-position to give the Δ⁹-enol VII. The methylation may be carried out by treating the Δ⁹-enone VI with methyl magnesium halide (e.g., methyl magnesium iodide, methyl magnesium bromide) in an inert organic solvent (e.g., tetrahydrofuran, benzene, toluene, ether), followed by hydrolysis.

Sixthly, the Δ⁹-enol VII is subjected to dehydration to give the Δ⁹,¹⁶-diene VIII. The dehydration can be executed by treating the Δ⁹-enol VII with a dehydrating agent (e.g., phosphorus oxychloride, phosphorus oxybromide, phosphorus pentoxide). For instance, the Δ⁹-enol VII is treated with phosphorus oxychloride in pyridine at 50 to 70° C. to yield the Δ⁹,¹⁶-diene VIII. The product in this step is a mixture of the Δ⁹,¹⁶-diene VIII and its isomer having the following formula:

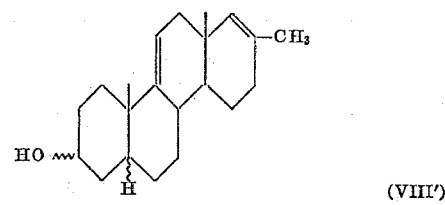

(VIII')

wherein the ripple mark (ʃ) is a generic indication of both the α- and β-configurations. Hereupon, the mixture may be subjected to the reaction in the following step as it is, because the separation of the by-product can be readily accomplished in that step.

Seventhly, the Δ⁹,¹⁶-diene VIII is subjected to oxidative ring-fission to give the 16-aldehyde IX. The ring-fission may be performed by treating the Δ⁹,¹⁶-diene VIII with a variety of oxidizing agents (e.g., oxygen-ozone, potassium permanganate, osmium tetroxide, periodic acid, perbenzoic acid, hydrogen peroxide). For instance, the Δ⁹,¹⁶-diene VIII is treated with osmium tetroxide in an inert solvent (e.g., benzene, toluene, ether, dioxane) at room temperature, followed by treatment with hydrogen sulfide, and the resulting oxidation product is treated with periodic acid in an inert solvent (e.g., methanol, ethanol, dioxane, tetrahydrofuran) at room temperature to give the 16-aldehyde IX. As stated above, the Δ⁹,¹⁶-diene VIII may be generally subjected to the reaction in this step as an isomeric mixture with the Δ⁹,¹⁷-diene VIII'. In such case, the reaction product is a mixture of the 16-aldehyde IX and its isomer having the following formula:

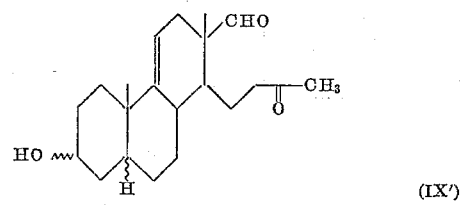

(IX')

wherein the ripple mark (ʃ) is a generic indication of both the α- and β-configurations. Although the mixture may be employed in the following step without separation, it is preferred to separate each component after or in the course of this step. The separation can be readily accomplished by a conventional procedure (e.g., chromatography).

Lastly, the 16-aldehyde IX is subjected to cyclization to give the objective pregnadiene I. The cyclization may be accomplished by heating the 16-aldehyde IX with a basic substance (e.g., diethylamine, triethylamine, tripropylamine, piperidine) in an inert solvent (e.g., benzene, toluene, xylene).

Although the method of this invention is hereinbefore illustrated step by step, some of these steps may be executed successively without the isolation of the product in each step.

The final product is the pregnadiene I, i.e., 3α-hydroxy-5α-pregna-9(11),16-dien-20-one of formula Ia, 3α-hydroxy-5β-pregna-9(11),16-dien-20-one of formula Ib, 3β-hydroxy-5α-pregna-9(11),16-dien-20-one of formula Ic and 3β-hydroxy-5β-pregna-9(11),16-dien-20-one of formula Id.
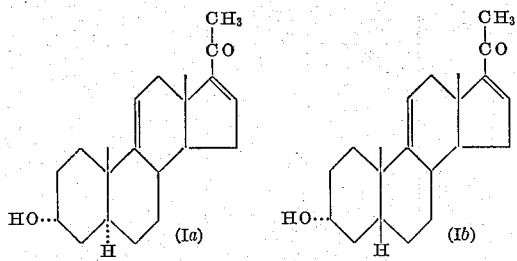
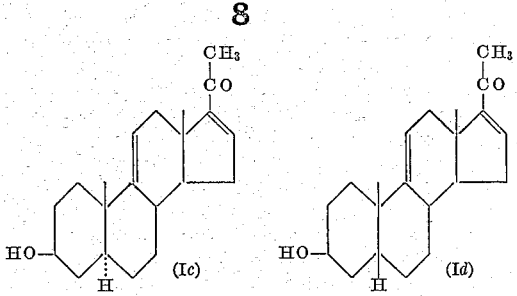
For illustration, a typical conversion of 3α-hydroxy-D-homo-18-nor-5β-androst-13(17a)-en-17-one IIb into the corresponding final product, 3α-hydroxy-5β-pregna-D-homo-18-nor-5β-androst-13(17a)-en-17-one IIb into invention is set forth in the following scheme:
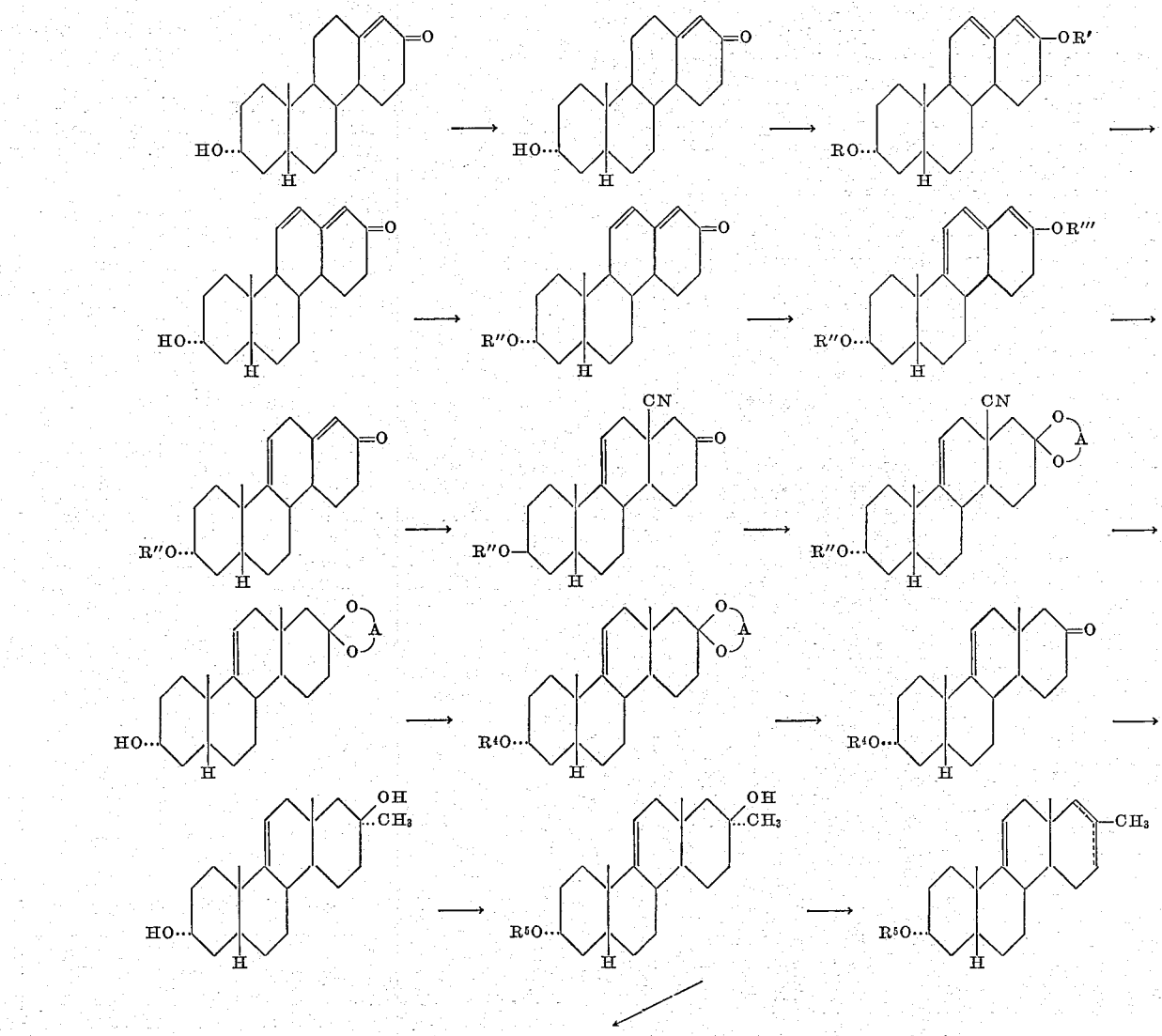
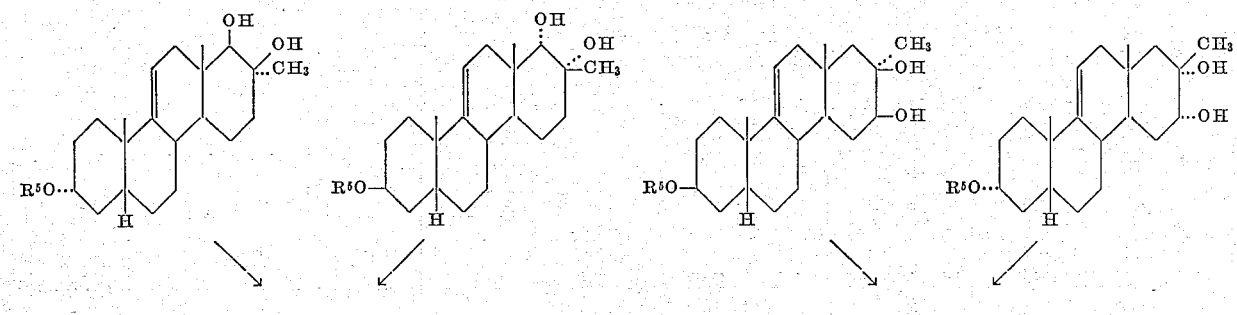

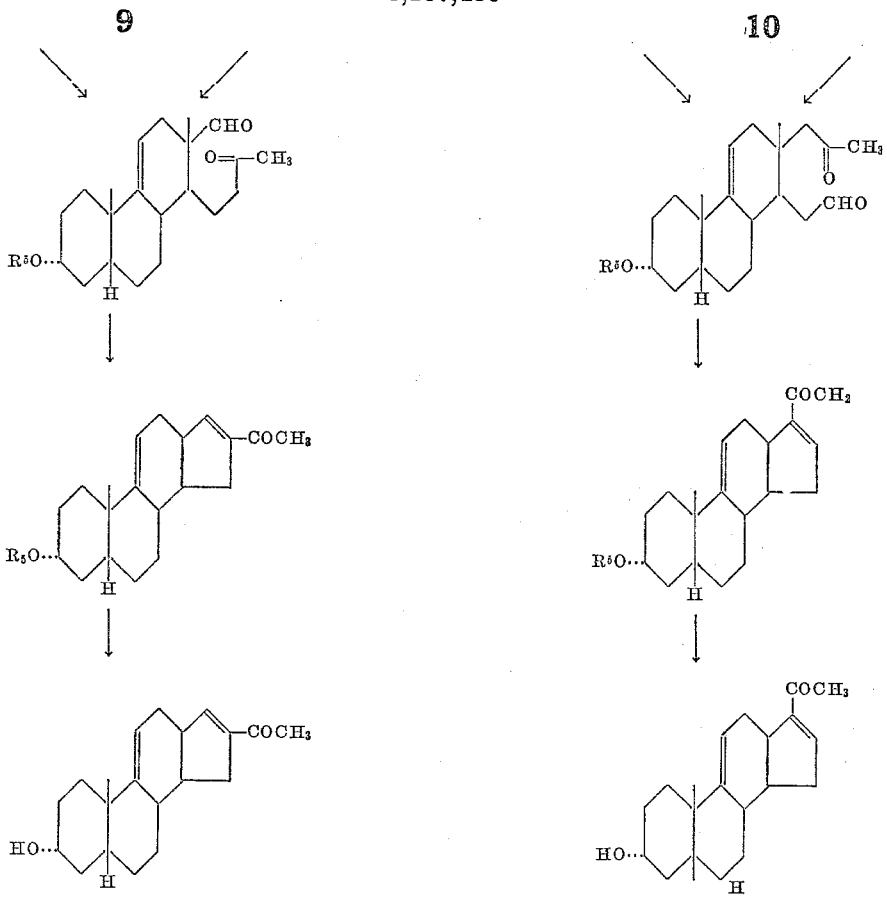

wherein R, R', R'', R⁴ and R⁵ each represents a lower alkanoyl group (e.g., acetyl, propanoyl, butanoyl), R''' represents a lower alkyl group (e.g., methyl, propyl, butyl, ethyl) and A represents a lower alkylene group (e.g., ethylene, trimethylene).

The said final products are equally useful as intermediates in the synthesis of pharmacologically active steroids of pregnane series such as cortisone, hydrocortisone, prednisolone and dexamethasone. For instance, the pregnadiene I$c$ is converted into cortisone according to a conventional method [Callow et al.: J. Chem. Soc., p. 4739 (1956); Rosenkranz et al.: J. Am. Chem. Soc., 73, p. 4055 (1951); Rosenkranz et al.: Nature, 168, p. 28 (1951)]. The other products also can be converted into cortisone in the substantially same manner as illustrated above, if necessary, with some changes being obvious to those skilled in the art. For instance, the pregnadiene I$b$ is converted into 3α,17α-dihydroxy-5β-pregna-11,20-dione in the same manner as illustrated above [Callow et al.: J. Chem. Soc., p. 4739 (1956)] and then the latter may be converted to cortisone according to a conventional manner [Kritchevsky et al.: J. Am. Chem. Soc., 74, p. 483 (1952)].

The following examples illustrate presently-preferred methods of carrying out the present invention.

*Example 1*

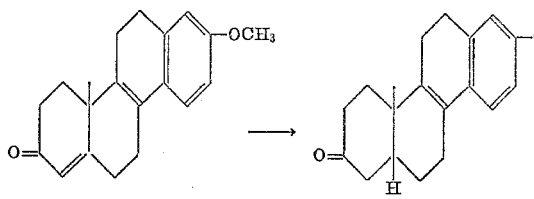

In a mixture of 15 ml. of benzene, 25 ml. of ethyl acetate, 3 ml. of 95% ethanol and a drop of 10%-sodium hydroxide solution, 3 g. of dl-17-methoxy-D-homo-18-nor-androsta-4,8,13,15,17-pentaen-3-one is hydrogenated over 0.6 g. of 10%-palladium-carbon at 25° C. under an atmospheric pressure. For 160 minutes, 329 ml. of hydrogen is absorbed. (Theoretical absorbtion under an atmospheric pressure at 25° C.: 247 ml.) Then, the catalyst is removed by filtration and washed with ethanol. The filtrate and the washing solution are combined and evaporated under reduced pressure to give 3.2 g. of residue. The residue is crystallized by treatment with cold ethanol or cold methanol to give 2.49 g. of dl-17-methoxy-D-homo-18-nor-5β-androsta-8,13,15,17-tetraen-3-one as scales. Recrystallization from cold ethanol gives pure product melting at 82–85° C. U.V. (EtOH): 273 mμ (ε16,000). I.R. (CHCl₃): 1714, 1612, 1576, 1503 cm.⁻¹.

*Analysis.*—Calcd. for $C_{20}H_{24}O_2$ (296.39): C, 81.04; H, 8.16. Found: C, 80.73; H, 8.24.

*Example 2*

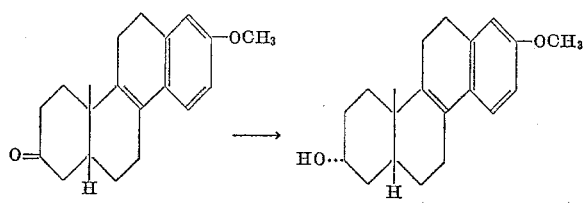

To a solution of 2 g. of tri-t-butoxyaluminium lithium hydride in 10 ml. of anhydrous tetrahydrofuran is added another solution of 1 g. of dl-17-methoxy-D-homo-18-nor-5β-androsta-8,13,15,17-tetraen-3-one in 10 ml. of anyhydrous tetrahydrofuran under ice-cooling, wherein the addition takes 15 minutes. The reaction mixture is stirred for 10 minutes under ice-cooling and for 2 hours at room temperature. Then, 2 ml. of water and 10 ml. of 2 N-hydrochloric acid are added under ice-cooling to decompose the excess of tri-t-butoxyaluminum lithium hydride and the mixture is extracted with ether. The extract is washed with saturated sodium bicarbonate solution and water, dried over anhydrous sodium sulfate, and evaporated under reduced pressure. The residue (1.0 g.) is crystallized from ether to give 855.8 mg. of dl-17-methoxy-D-homo-18-nor-5β-androsta-8,13,15,17 - tetraen-3α-ol as long columns. Recrystallization from ether-pentane mixture gives pure product melting at 125–126° C. U.V. (EtOH): 273 mμ (ε16,500). I.R. (Nujol): 1616, 1608, 1500 cm.⁻¹.

*Analysis*—Calcd. for $C_{20}H_{26}O_2$(298.41): C, 80.49; H, 8.78. Found: C, 80.74; H, 8.90.

*Example 3*

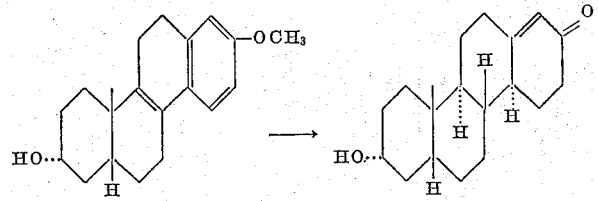

To a solution of 9 g. of metallic lithium in 270 ml. of liquid ammonia (freshly distilled in the presence of metallic lithium) is dropwise added another solution of 3 g. of dl-17-methoxy-D-homo-18-nor-5β-androsta - 8,13,15, 17-tetraen-3α-ol in a mixture of 22 ml. of anhydrous dioxane, 46 ml. of anhydrous ether and 38 ml. of anhydrous ethanol, wherein the dropwise addition takes 1.5 hours. After 15 minutes the excess of metallic lithium is inactivated by addition of 50 ml. of anhydrous ethanol and then liquid ammonia is evaporated. To the residue is added water under ice-cooling and the mixture is extracted with ether. The extract is washed with saturated sodium chloride solution, dried over anhydrous sodium sulfate and evaporated under reduced pressure to give 3.0 g. of residue. To a boiling solution of the residue in a mixture of 125 ml. of methanol is added 50 ml. of 4 N-hydrochloric acid within 10 minutes and then the mixture is refluxed for 10 minutes. The reaction mixture is chilled, poured into ice-water and extracted with chloroform. The extract is washed with saturated sodium chloride solution, dried over anhydrous sodium sulfate and evaporated under reduced pressure to give 3.0 g. of oily residue. Crystallization from ether gives 906.4 mg. of crystals melting at 168–171° C. The mother liquor is chromotographed on 60 g. of neutral alumina. From eluates with benzene-chloroform (8:2–2) mixture is obtained 179.5 mg. of crystals melting at 169–171° C. Totally, 1.086 g. of dl-3α-hydroxy-D-homo-18-nor-5β-androst-13(17a)-en-17-one is obtained. On the other hand, from eluates with benzene and benzene-chloroform (8:2) mixture is obtained 305.3 mg. of another product melting at 164–165° C. This product is a steric isomer as to the B/C juncture, but its strict configuration has never been determined.

Recrystallization of dl-3α-hydroxy-D-homo-18-nor-5β-androst-13(17a)-en-17-one from acetone-ether mixture gives pure product melting at 170–171° C. as plates. U.V. (tOH): 241.3 mμ (ε16,820). I.R. (Nujol): 3460, 1662, 1645, 1617 cm.⁻¹.

*Analysis*—Calcd. for $C_{19}H_{28}O_2$(288.41): C, 79.12; H, 9.79. Found: C, 78.96; H, 9.60.

Recrystallization of the isomer from acetone-ether mixture gives pure compound melting at 168–169° C. as plates. This M.P. is apparently depressed on admixture with dl-3α-hydroxy-D-homo-18-nor-5β-androst-13(17a) - en-17-one. U.V. (EtOH): 243.8 mμ (ε14,380). I.R. (Nujol): 3450, 1677, 1662, 1630 cm.⁻¹.

The yielding ratio of dl-3α-hydroxy-D-homo-18-nor-5β-androst-13(17a)-en-17-one to the isomer is about 7:2.

*Example 4*

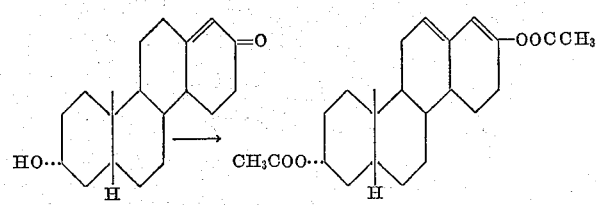

To a solution of 400 mg. of dl-3α-hydroxy-D-homo-18-nor-5β-androst-13(17a) en-17-one in 5 ml. of isopropenyl acetate is added 20 mg. of p-toluenesulfonic acid monohydrate and the mixture is refluxed for 4 hours at 100–105° C. under nitrogen current. After addition of sodium acetate, the mixture is concentrated under reduced pressure and then extracted with ether. The extract is washed with water, dried over anhydrous sodium sulfate and evaporated under reduced pressure to give 511.3 mg. of oily residue. The residue is crystallized from ether-pentane mixture to give 195.7 mg. of dl-3α,17-diacetoxy-D-homo-18-nor-5β-androsta-12,17 - diene. Recrystallization from ether-pentane mixture gives pure crystals melting at 97–109° C. U.V. (EtOH): 235 mμ (ε18,840).

*Analysis*—Calcd. for $C_{23}H_{32}O_4$(372.49): C, 74.16; H, 8.66. Found: C, 74.33; H, 8.69.

*Example 5*

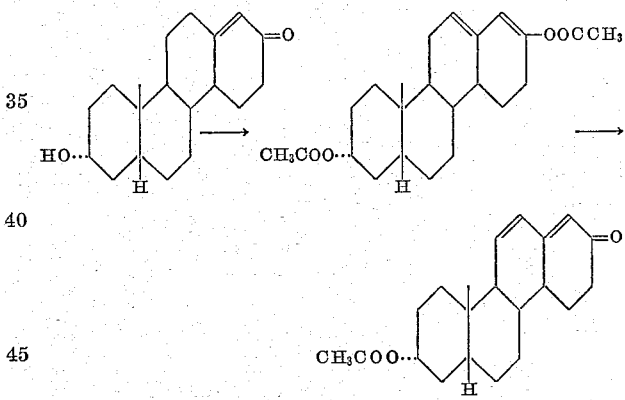

To a solution of 6.8 g. of dl-3α-hydroxy-D-homo-18-nor-5β-androst-13(17a)-en-17-one in 90 ml. of isopropenyl acetate is added 330 mg. of p-toluensulfonic acid monohydrate and the mixture refluxed for 4 hours on an oil bath (110° C.) with stirring under nitrogen current. After addition of 350 mg. of sodium acetate, the mixture is concentrated under reduced pressure and extracted with ether. The extract is washed with water, dried over anhydrous sodium sulfate and evaporated under reduced pressure to give 9.6 g. of oil residue.

To a solution of this oily residue in 137 ml. of acetic acid is added 51 ml. of collidine under ice-cooling. Then 42 ml. of 10%-bromine-acetic acid solution is added dropwise with good stirring under ice-cooling, the dropwise addition taking 30 minutes. The mixture is then stirred at 15–20° C. for 20 minutes and poured into 1000 ml. of cold water containing 256 g. of sodium bicarbonate and extracted with ether. The extract is washed with water, and dried over anhydrous sodium sulfate.

To a dimethylformamide solution containing 10.5 g. of lithium bromide and suspending 10.5 g. of lithium carbonate is added the ether solution prepared above with stirring. After distilling off ether, the mixture is refluxed for 40 minutes under nitrogen current, then cooled reaction mixture is poured into a mixture of 51 ml. of acetic acid and 510 ml. of water and extracted with ether.

The extract is washed with 2 N-sodium carbonate and water, dried over anhydrous sodium sulfate and evaporated under reduced pressure to give 9.1 g. of oily residue. The residue is dissolved in 25 ml. of pyridine and 15 ml. of acetic anhydride and allowed to stand over night. Thus obtained crude oily acetylate (8.76 g.) is chromatographed on 250 g. of neutral alumina. From eluates with petroleum ether-benzene (2:1) mixture, petroleum ether-benzene (1:1) mixture, petroleum ether-benzene (1:2) mixture and benzene is obtained 2.42 g. of crystals melting at 148–152° C. by recrystallization from ether-pentane mixture.

Combined oily residue (1.43 g.) from mother liquors and uncrystallized fractions is chromatographed on 30 g. of neutral alumina. From eluates with petroleum ether-benzene (2:1) mixture and petroleum ether-benzene (1:1) mixture is obtained further 172.2 mg. of crystals melting at 147–149° C. by recrystallization from ether-pentane mixture. Totally, 2.6 g. of dl-3α-acetyloxy-D-homo-18-nor-5β-androsta-11,13(17a)-dien-17-one is obtained. Further recrystallization from ether gives pure product melting 149–151° C. as needles. U.V. (EtOH): 285 mμ (ε 28,840). I.R. (Nujol): 1724, 1660, 1617, 1585, 1248, 1254 cm.$^{-1}$.

*Analysis.*—Calcd. for $C_{21}H_{28}O_3$ (328.44): C, 76.79; H, 8.59. Found: C, 76.67; H, 8.59.

*Example 6*

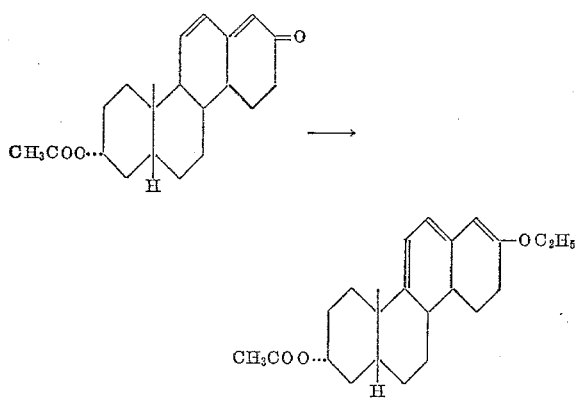

A mixture of 290 mg. of dl-3α-acetyloxy-D-homo-18-nor-5β-androsta-11,13(17a)-dien-17-one, 30 mg. of pyridine hydrochloride, 1.8 ml. of ethyl orthoformate, 1.5 ml. of anhydrous ethanol and 15 ml. of anhydrous benzene is refluxed for 3 hours on an oil bath and then poured into a mixture of 28 ml. of 2 N-sodium carbonate solution and 10 ml. of ether under ice-cooling. The ether layer is separated and the aqueous layer is extracted twice with ether. All of ether layers are combined, washed with water, dried over anhydrous sodium sulfate and evaporated. The residue is treated with ethanol to give 170.8 g. of crystals. The mother liquor is evaporated and the residue (171 mg.) is chromatographed on 2 g. of alumina. From eluates with petroleum ether-benzene (9:1) mixture, petroleum ether-benzene (8:2) mixture, petroleum ether-benzene (7:3) mixture and petroleum ether-benzene (5:5) mixture is obtained further 10.5 ml. of crystals by recrystallization from ether-pentane mixture. Totally, 181.3 mg. of dl-3α-acetyloxy-17-ethoxy-D-homo-18-nor-5β-androsta-9(11),12,17-triene is obtained. Recrystallization from ether-pentane mixture gives pure product melting at 118–122° C./130° C. as fine columns. U.V. (EtOH): 321 mμ (ε 20,870). I.R. (Nujol): 1723, 1641, 1621 cm.$^{-1}$.

*Analysis.*—Calcd. for $C_{23}H_{32}O_3$ (356.49): C, 77.49; H, 9.05. Found: C, 77.39; H, 9.09.

*Example 7*

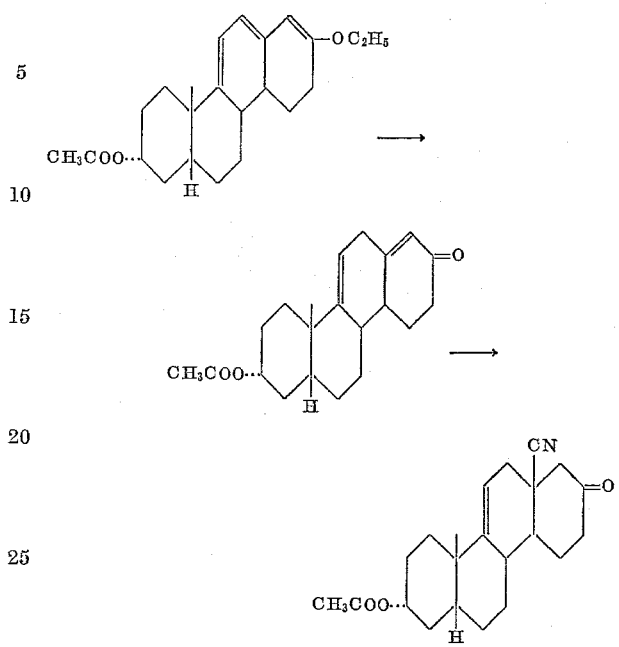

To a solution of 232 mg. of dl-3α-acetyloxy-17-ethoxy-D-homo-18-nor-5β-androsta-9(11),12,17-triene in 8 ml. of glacial acetic acid is added 8 ml. of water and heated for 15 minutes at 90° C. on a water bath. Then, at once, the reaction mixture is concentrated under reduced pressure and the concentrate is extracted with ether. The extract is washed with 2 N-sodium carbonate solution and water, dried over anhydrous sodium sulfate and evaporated under reduced pressure to give 239.5 mg. of residue (U.V. (EtOH): 235 mμ).

The residue is dissolved in 3 ml. of anhydrous tetrahydrofuran and the solution is added dropwise to a solution of 0.45 ml. of triethyl aluminium and 0.52 ml. of hydrocyanic acid in 7 ml. of anhydrous tetrahydrofuran under ice-cooling. Then, the mixture is sealed with a stopper and allowed to stand at room temperature for 2 hours. After decomposition of triethyl aluminium by addition of a small amount of methanol, the mixture is poured into cold 2 N-hydrochloric acid and extracted with ether-chloroform (3:1) mixture. The extract is washed with 2 N-sodium hydroxide solution and water, dried over anhydrous sodium sulfate and evaporated under reduced pressure. The residue is crystallized from acetone-ether-pentane mixture to give 110.7 mg. of crystals. The residue of mother liquor (134.2 mg.) is chromatographed on 4 g. of alumina. From eluates with benzene, benzene-chloroform (9:1) mixture and benzene-chloroform (7:3) mixture is obtained further 10.1 mg. of crystals by crystallization from acetone-ether mixture. Totally, 120.8 mg. of dl-3α-acetyloxy-17-oxo-D-homo-5β-androst-9(11)-ene-18-nitrile is obtained. Recrystallization from acetone-ether mixture gives pure product melting at 249–251° C. I.R. (CHCl$_3$): 2240, 1726 cm.$^{-1}$.

*Analysis.*—Calcd. for $C_{22}H_{28}O_3N$ (355.46): C, 74.33; H, 8.22; N, 3.94. Found: C, 74.31; H, 8.26; N, 3.92.

*Example 8*

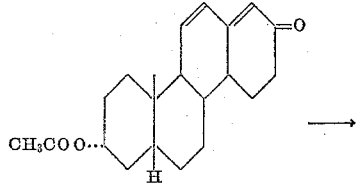

Example 8—Continued

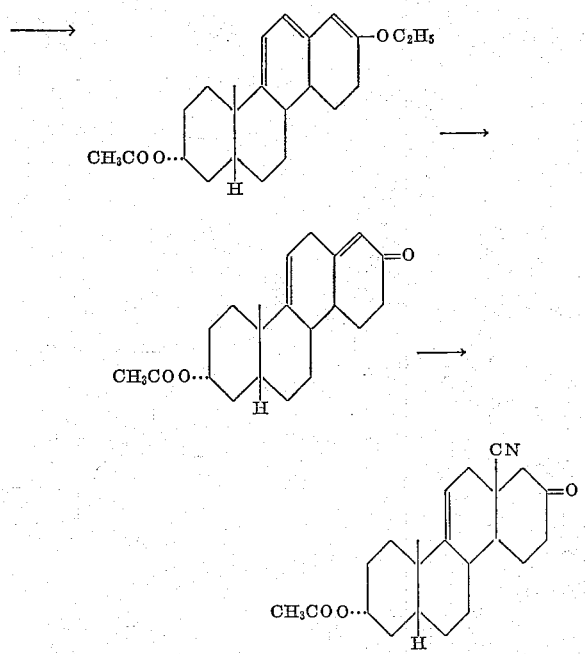

A mixture of 2.6 g. of dl-3α-acetyloxy-D-homo-18-nor-5β-androsta-11,13(17a)-dien-17-one, 65 ml. of anhydrous benzene, 6.5 ml. of anhydrous ethanol, 7.8 g. of ethyl orthoformate and 130 mg. of pyridine hydrochloride is refluxed for 2 hours. The reaction mixture is poured into 20 ml. of cold 2 N-sodium carbonate solution and extracted with ether. The extract is washed with water, dried over anhydrous sodium sulfate and evaporated under reduced pressure to give 3.2 g. of residue (trien-enol ether structure is confirmed by U.V. spectrum measurement). The residue is added to 100 ml. of 70%-acetic acid (v./v.) and heated to 90° C. to clarify the solution and then 40 ml. of water added. The mixture is heated at 90° C. for 30 minutes, poured into ice-water and extracted with chloroform. The extract is washed with water, sodium bicarbonate solution and water in turn, dried over anhydrous sodium sulfate and evaporated under reduced pressure to give 2.80 g. of residue.

The residue is dried well and dissolved in 30 ml. of anhydrous tetrahydrofuran. This solution is added to a mixture of 3.62 g. of triethyl aluminium, 1.08 g. of hydrocyanic acid and 50 ml. of anhydrous tetrahydrofuran under ice-cooling. After 20 minutes, the mixture is sealed with a stopper and allowed to stand at room temperature. After decomposition of excess of triethyl aluminium by addition of 6 ml. of ethanol under ice-cooling, the mixture is poured into ice-water and extracted with ether. The extract is washed with water, dried over anhydrous sodium sulfate and evaporated under reduced pressure to give 2.97 g. of oily residue. The residue is crystallized by treatment with ether to give 1.0944 g. of crystals melting at 244–246° C. The mother liquor is evaporated and the residue is chromatographed on 15 g. of neutral alumina. From eluates with petroleum ether-benzene (1:2) mixture and benzene is obtained further 436.5 mg. of crystals melting at 244–246° C. by crystallization with ether. Totally, 1.53 g. of dl-3α-acetyloxy-17-oxo-D-homo-5β-androst-9(11)-ene-18-nitrile is obtained.

Example 9

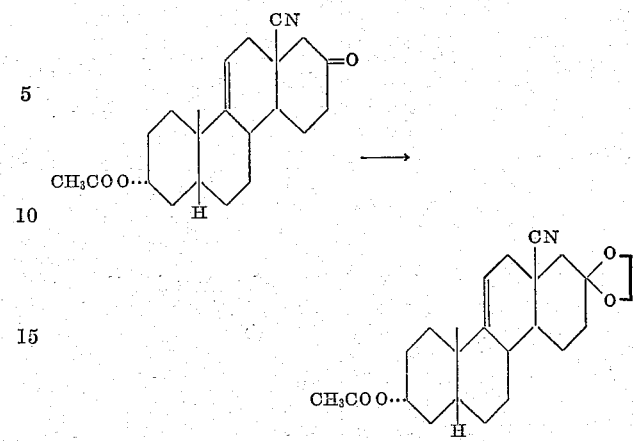

To a solution of 85 mg. of dl-3α-acetyloxy-17-oxo-D-homo-5β-androst-9(11)-ene-18-nitrile in 12 ml. of ethylene glycol is added 4.0 mg. of p-toluenesulfonic acid and the mixture is refluxed under 4 mm. Hg pressure at 75–80° C. for 1 hour. Then, ethylene glycol is gradually distilled off under the same condition, during which 8 ml. of new ethylene glycol is supplied 3 times to the reaction mixture. After 1–1.5 hours, all ethylene glycol is distilled off. The cooled residue is poured into a large amount of ice-water and extracted with chloroform. The extract is washed with 2 N-sodium carbonate solution and water until the washing shows no acidity, dried over anhydrous sodium sulfate and evaporated under reduced pressure. The residue is crystallized from acetone-ether mixture to give 78.6 mg. of dl-3α-acetyloxy-17,17-ethylenedioxy-D-homo-5β-androst-9(11)-ene-18-nitrile melting at 247–251° C. Recrystallization from acetone-ether mixture gives pure product melting at 251–252° C. as needles. I.R. (CHCl$_3$): 2248, 1725, 1063 cm.$^{-1}$.

*Analysis.*—Calcd. for $C_{24}H_{33}O_4N$(399.51): C, 72.15; H, 8.33. Found: C, 71.92; H, 8.44.

Example 10

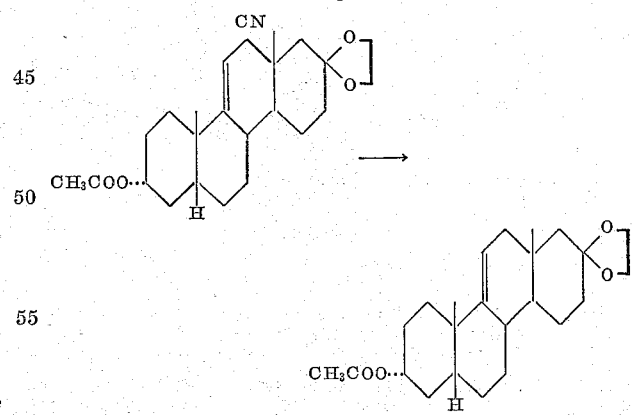

To a solution of 300 mg. of lithium aluminium hydride in 20 ml. of anhydrous tetrahydrofuran is added dropwise another solution of 300 mg. of dl-3α-acetyloxy-17,17-ethylene-dioxy-D-homo-5β-androst-9(11)-ene-18-nitrile in 50 ml. of anhydrous tetrahydrofuran at 0° C. with stirring. The dropwise addition takes 20 minutes. After the addition, the mixture is stirred for further 2 hours at room temperature. Excess of lithium aluminium hydride is decomposed by addition of water under ice-cooling and the mixture is diluted with large amount of water under ice-cooling and extracted with chloroform. The extract is washed with water, dried over anhydrous sodium sulfate and evaporated under reduced pressure to give 350.5 mg. of residue. The residue is dissolved in 45 ml. of methanol and a solution of 3.36 g. of sodium hydroxide in 7 ml. of water is added. Then, the mixture is refluxed on an oil bath under nitrogen current for about 7 hours during which 5 ml. of methanol is supplied and allowed to stand over night at room temperature. Then, a solution of 1.3 g. of sodium hydroxide in 1.5 ml. of water and 2 ml. of methanol are added and the mixture is refluxed for 8.7 hours under the same condition. I.R. spectrum measurement of a sample of the reaction mixture shows a strong absorption band attributable to an aldehyde function. The reaction mixture is diluted with a large amount of water and extracted with chloroform. The extract is washed with 10%-tartaric acid and twice with water, dried over anhydrous sodium sulfate and evaporated under reduced pressure to give 258.3 mg. of neutral residue.

To a solution of the residue in 8.5 ml. of triethylene glycol are added 440 mg. of potassium hydroxide and 1.3 ml. of 80%-hydrazine-hydrate and the mixture is gradually heated on an oil bath. The temperature is slowly raised to 130–140° C. Then, the mixture is kept at the said temperature for 1 hour, wherein excess of hydrazine-hydrate and resulted water is distilled off. Then, taking 50 minutes, the temperature is slowly raised to 210° C. and the mixture is heated for 3 hours at 210–220° C., during which nitrogen gas is violently generated. After cooling the mixture is diluted with water and extracted with chloroform. The extract is washed twice with 10%-tartaric acid and water, dried over anhydrous sodium sulfate and evaporated under reduced pressure to give 199.1 mg. of neutral residue. The residue is dissolved in 1.5 ml. of acetic anhydride and 1.5 ml. of anhydrous pyridine and the mixture is allowed to stand at room temperature for 1 night. Thus obtained crude acetyl product is chromatographed on 8 g. of neutral alumina. From eluates with petroleum ether-benzene (8:2) mixture, petroleum ether-benzene (7:3) mixture and petroleum ether-benzene (6:4) mixture is obtained 123 mg. of dl-3α-acetyloxy-17,17-ethlyene-dioxy-D-homo-5β-androst-9(11)-ene melting at 124–125° C. by recrystallization from ether-pentane mixture. Further recrystallization from ether-pentane mixture gives pure product melting at 125–127° C. as plates. I.R. (CHCl$_3$): 3600, 3440, 1100, 1075 cm.$^{-1}$.

Analysis.—Calcd. for $C_{24}H_{36}O_4$(388.53): C, 74.19; H, 9.34. Found: C, 74.05, H, 9.48

Example 11

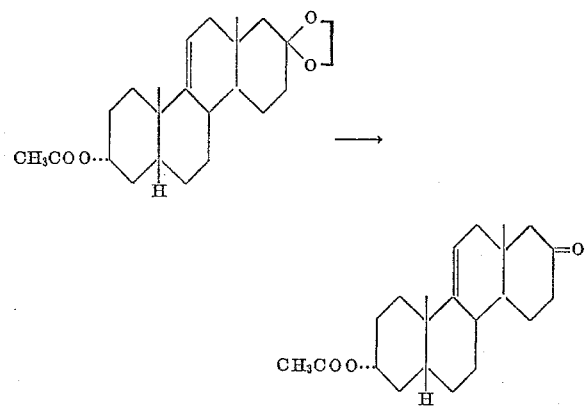

A solution of 110 mg. of dl-3α-acetyloxy-17,17-ethylene-dioxy-D-homo-5β-androst-9(11)-ene in 5 ml. of acetic acid and 2.5 ml. of water is heated on a water bath, and concentrated under reduced pressure. The concentrate is diluted with water and extracted with ether-chloroform (3:1) mixture. The extract is washed with 7%-sodium bicarbonate solution and water, dried over anhydrous sodium sulfate and evaporated under reduced pressure to give 97.3 mg. of crystalline residue. Crystallization from ether-pentane mixture gives 88.9 mg. of dl-3α-acetyloxy-D-homo-5β-androst-9(11)-en-17-one. Recrystallization from ether pentane mixtures gives pure product melting at 155–156.5° C. as leaflets. I.R. (CHCl$_3$): 1710 (a little broad).

Analysis.—Calcd. for $C_{22}H_{32}O_3$(344.48): C, 76.70; H, 9.36. Found: C, 76.79; H, 9.57

Example 12

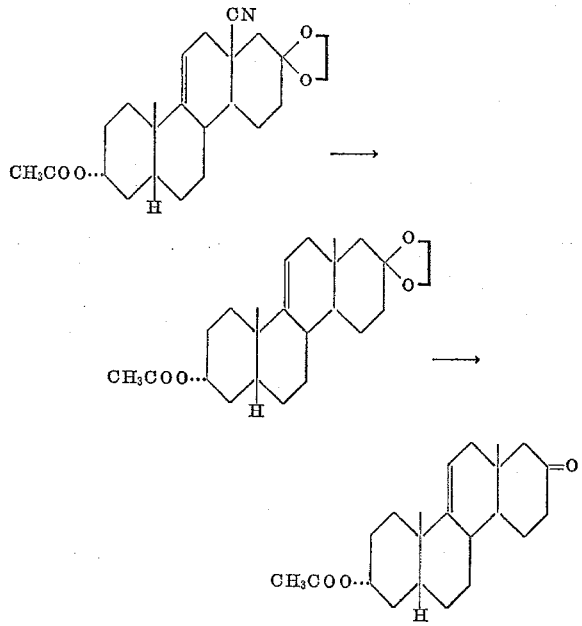

To a solution of 600 mg. of lithium aluminium hydride in 30 ml. of anhydrous tetrahydrofuran is added dropwise another solution of 1.1 g. of dl-3α-acetyloxy-17,17-ethylene-dioxy-D-homo-5β-androst-9(11)-ene-18-nitrile in 20 ml. of anhydrous tetrahydrofuran at 0° C. with stirring. The dropwise addition takes 20 minutes. Then, the mixture is stirred for 2.5 hours at 0° C. and the excess of lithium aluminium hydride is decomposed by addition of 50 ml. of ice-water. The mixture is diluted with a large amount of water and extracted with chloroform. The extract is washed with water, dried over anhydrous sodium sulfate and evaporated under reduced pressure to give 1.07 g. of residue. The residue is dissolved in 130 ml. of methanol and a solution of 6 g. of sodium hydroxide in 20 ml. of water. The mixture is refluxed for 3 hours and concentrated under reduced pressure. The concentrate is diluted with ice-water and extracted with chloroform. The extract is washed twice with 10%-tartaric acid, with 2 N-sodium carbonate and with water, dried over anhydrous sodium sulfate and evaporated under reduced pressure to give 953 mg. of residue.

The residue is suspended in 34 ml. of triethylene glycol and 1.8 g. of potassium hydroxide and 6 ml. of hydrazine-hydrate are added. The mixture is heated slowly to 130±2° C. and the temperature is kept at the said range for 1 hour, wherein excess of hydrazine-hydrate and resulting water are distilled off in the same manner as in the former example. Then, the temperature is slowly raised to 210° C. and the mixture is heated at 210–220° C. for 3 hours. The mixture is poured into ice-water and extracted with chloroform. The extract is washed twice with 10%-tartaric acid, with 2 N-sodium hydroxide solution and with water, dried over anhydrous sodium sulfate and evaporated under reduced pressure to give 815.2 mg. of residue. The residue is dissolved in 30 ml. of acetic acid and 12 ml. of water and the mixture is heated at 99° C. for 30 minutes. Treatment in the same manner as in the former example gives 697.6 mg. of residue. The residue is dissolved in 5 ml. of anhydrous pyridine and 3 ml. of acetic anhydride and the mixture is allowed to stand at room temperature for 1 night. Thus obtained crude acetate is crystallized from ether-pentane mixture to give 435 mg. of crystals. 350 mg. of residue obtained from the mother liquor is chromatographed on 8 g. of neutral alumina. From eluates with petroleum ether-benzene (8:2) mixture, petroleum ether-benzene (7:3) mixture, petroleum ether-benzene (5:5) mixture and petroleum ether-benzene (3:7) mixture is obtained further 145.9 mg. of crystals by crystallization from ether-pentane mixture. Totally, 580.9 mg. of dl-3α-acetyloxy-D-homo-5β-androst-9(11)-en-17-one is obtained.

*Example 13*

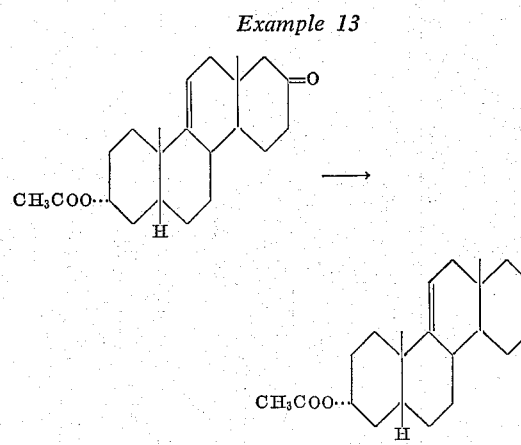

To an ether solution of Grignard agent prepared from 3 g. of methyl iodide, 550 mg. of metallic magnesium and 15 ml. of anhydrous ether is added dropwise another solution of 580 mg. of dl-3α-acetyloxy-D-homo-5β-androst-9(11)-en-17-one in 15 ml. of benzene with stirring under ice-cooling, the dropwise addition taking 30 minutes. The mixture is stirred at room temperature for 1 hour. After removal of ether, 30 ml. of benzene is added and the mixture is refluxed for 2 hours. The mixture is diluted with 10%-aqueous ammonia and then with a large amount of water under ice-cooling and extracted with warm chloroform. The extract is washed twice with water, dried over anhydrous sodium sulfate and evaporated under reduced pressure to give 570 mg. of residue. The residue is dissolved in 20 ml. of anhydrous pyridine and 12 ml. of acetic anhydride and the mixture is heated at 80–90° C. for 50 minutes. Thus obtained crude acetate is crystallized from acetone-ether mixture to give 461.6 mg. of dl-3α - acetyloxy - 17α - methyl - D-homo-androst-9(11)-en-17β - ol. Recrystallization from acetone-ether mixture gives pure product melting at 184–186° C. I.R. (CHCl₃): 3600(broad), 1720 cm.⁻¹.

*Analysis.*—Calcd. for $C_{23}H_{36}O_3$(360.52): C, 67.62; H, 10.07. Found: C, 76.84; H, 10.28.

*Example 14*

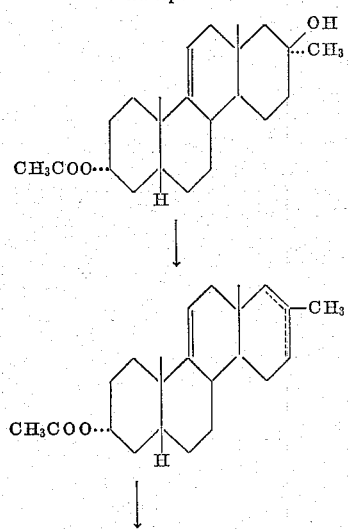

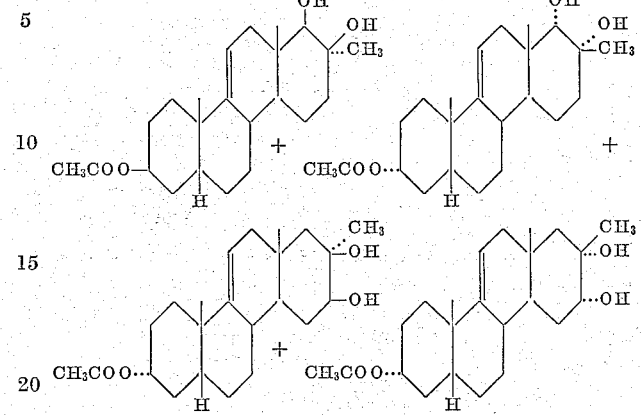

To a solution of 450 mg. of dl-3α-acetyloxy-17α-methyl-D-homo-5β-androst-9(11)-en-17β-ol in 3.5 ml. of anhydrous pyridine is added dropwise 0.44 ml. of phosphorus oxychloride under ice-cooling and the mixture is heated at 60–65° C. for 40 minutes. Then, the mixture is concentrated under reduced pressure and extracted with chloroform. The extract is washed with 2 N-hydrochloric acid, 2 N-sodium carbonate solution and water in turn, dried over anhydrous sodium sulfate and evaporated under reduced pressure to give 440.7 mg. of residue containing an isomeric mixture of dl-3α-acetyloxy-17-methyl-D-homo-5β-androsta-9(11),16-diene and dl-3α-acetyloxy-17-methyl-D-homo-5β-androsta-9(11),17-diene. The residue is dissolved in 15 ml. of anhydrous benzene (free from thiophene) and a solution of 380 mg. of osmium tetroxide in 0.46 ml. of anhydrous pyridine is added under ice-cooling. The mixture is shaken to clarify and allowed to stand at room temperature for 1 night. Precipitated substances are dissolved by addition of 30 ml. of dioxane and hydrogen sulfide is blown into the mixture for 20 minutes. Precipitated osmium sulfide is removed by filtration through infusorial earth (Celite). The filtrate is concentrated under reduced pressure and extracted with chloroform. The chloroform solution is washed with water, dried over anhydrous sodium sulfate and evaporated under reduced pressure to give 477.7 mg. of residue. The residue is chromatographed on neutral alumina. From eluates with ether and ether-pentane mixture 110 mg. of dl-3α-acetyloxy-17α-methyl-D-homo-5β-androst-9(11)-ene-17β,17aβ-diol is obtained. From eluates with benzene-chloroform (9:1) mixture and benzene-chloroform (8:2) mixture is obtained 67.8 mg. of dl-3α-acetyloxy - 17β - methyl - D - homo-5β-androst-9(11)-ene-17α,17aα-diol. From eluates with benzene-chloroform (8:2) mixture, benzene-chloroform (7:3) mixture, benzene-chloroform (5:5) mixture, benzene-chloroform (3:7) mixture and chloroform is obtained 56.2 mg. of dl-3α-acetyloxy - 17α - methyl - D-homo-5β-androst-9(11)-ene-16β,17β-diol. From eluates with chloroform-methanol (99:1) mixture is obtained 48.3 mg. of dl-3α-acetyloxy-17β-methyl-D-homo-5β-androst-9(11)-ene-16α,17α-diol.

dl - 3α - acetyloxy - 17α - methyl-D-homo-5β-androst-9(11)-ene-17β,17aβ-diol: columns melting at 183–185° C., recrystallized from acetone-ether mixture. I.R. (CHCl₃): 3560–3440, 1720 cm.⁻¹.

*Analysis.*—Calcd. for $C_{23}H_{36}O_4$(376.52); C, 73.36; H, 9.64. Found: C, 73.49; H, 9.92.

dl - 3α - acetyloxy - 17β - methyl-D-homo-5β-androst-9(11)-ene-17α,17aα-diol: plates melting at 181–183° C., recrystallized from acetone-ether mixture. I.R. (CHCl₃): 3520, 1720 cm.⁻¹.

*Analysis.*—Calcd. for $C_{23}H_{36}O_4$(376.52): C, 73.36; H, 9.64. Found: C, 71.50; H, 9.55.

dl - 3α - acetyloxy - 17α - methyl-D-homo-5β-androst-9(11)-ene-16β,17β-diol: fine columns melting at 205–207° C., recrystallized from acetone-ether mixture. I.R. (CHCl₃): 3550–3440, 1718 cm.⁻¹.

*Analysis.*—Calcd. for C₂₃H₃₆O₄(376.52): C, 73.36, H, 9.64. Found: C, 71.95; H, 9.60.

dl - 3α - acetyloxy - 17β - methyl-D-homo-5β-androst-9(11)-ene-16α,17α-diol: columns or plates melting at 196–197° C., recrystallized from acetone-ether mixture. I.R. (CHCl₃): 3550, 1715 cm.⁻¹.

*Analysis.*—Calcd. for C₂₃H₃₆O₄(376.52): C, 73.36; H, 9.64. Found: C, 73.10; H, 9.68.

*Example 15*

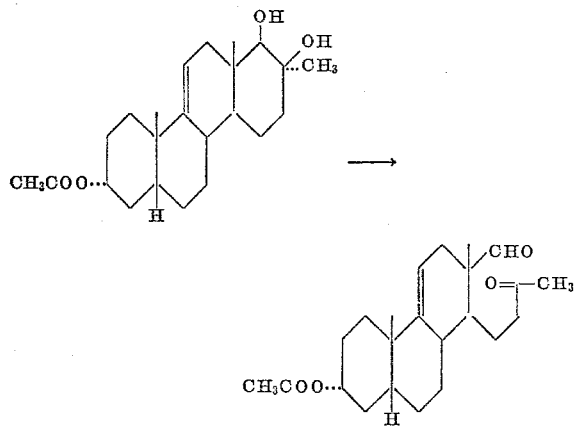

To a solution of 100 mg. of dl-3α-acetyloxy-17β-methyl-D-homo-5β-androst-9(11)-ene-17β,17aβ-diol in 3 ml. of dioxane and 2.3 ml. of methanol is added another solution of 85 mg. of periodic acid-dihydrate in 1.8 ml. of water and the mixture is allowed to stand at room temperature for 2.5 hours. The mixture is poured into ice-water and extracted 3 times with chloroform. The extract is washed with 2 N-sodium carbonate solution and water, dried over anhydrous sodium sulfate and evaporated under reduced pressure to give 93.3 mg. of dl-3α-acetyloxy-16-acetyl-16,17-seco-5β-androst-9(11)-en-17-al as oily residue.

*Example 16*

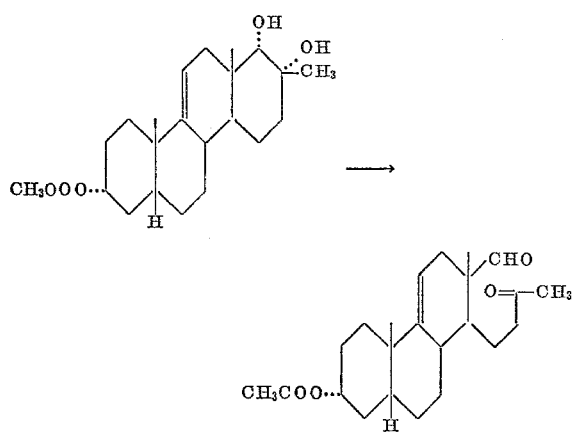

To a solution of 62 mg. of dl-3α-acetyloxy-17β-methyl-D-homo-5β-androst-9(11)-ene-17α,17aα-diol in 2 ml. of dioxane and 1.5 ml. of methanol is added another solution of 52 mg. of periodic acid-dihydrate in 1.2 ml. of water and the mixture is allowed to stand on for 3 hours at room temperature. Working up in the similar manner as in the Example 15, 67 mg. of dl-3α-acetyloxy-16-acetyl-16,17-seco-5β-androst-9(11)-en-17-al is obtained as oily residue. I.R. (CHCl₃): 2680, 1715 cm.⁻¹.

*Example 17*

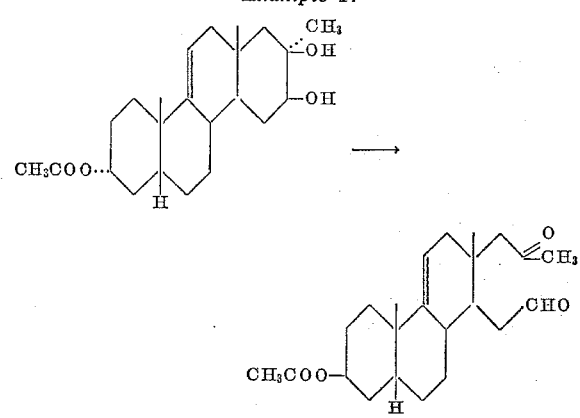

To a solution of 50 mg. of dl-3α-acetyloxy-17α-methyl-D-homo-5β-androst-9(11)-ene-16β,17β-diol in 2 ml. of dioxane and 1.5 ml. of methanol is added another solution of 42 mg. of periodic acid-dihydrate in 0.9 ml. of water and the mixture is allowed to stand for 2 hours at room temperature. Working up in the similar manner as in the Example 15, 50 mg. of dl-3α-acetyloxy-17-acetyl-16,17-seco-5β-androst-9(11)-en-16-al is obtained as oily residue.

*Example 18*

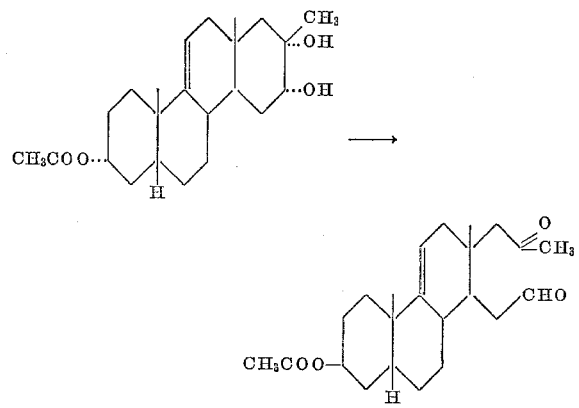

To a solution of 40 mg. of dl-3α-acetyloxy-17β-methyl-D-homo-5β-androst-9(11)-ene16α,17α-diol in 1.3 ml. of dioxane and 1 ml. of methanol is added another solution of 35 mg. of periodic acid-dihydrate in 0.8 ml. of water and the mixture is allowed to stand for 4 hours at room temperature. Working up in the similar manner as in the Example 15, 49.3 mg. of dl-3α-acetyloxy-17-acetyl-16, 17-seco-5β-androst-9(11)-ene-16-al is obtained as oily residue. I.R. (CHCl₃): 2700, 1715 cm.⁻¹.

*Example 19*

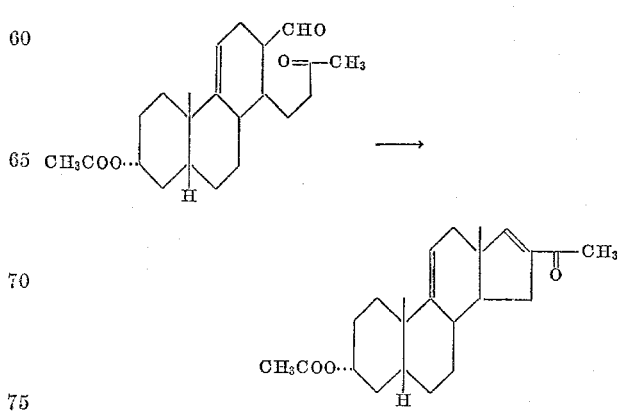

To a solution of 160 mg. of oily dl-3α-acetyloxy-16-acetyl-16,17-seco-5β-androst-9(11)-en-17-al in 4 ml. of xylene is added 4 ml. of a xylene mixture prepared by dissolving 0.864 ml. of acetic acid and 1.4 ml. of triethyl amine in 10 ml. of xylene and the mixture is sealed under 0.6 mm. Hg pressure. Then, the sealed tube is heated for 8 hours in a boiling xylene bath. After cooling, the reaction mixture is extracted with chloroform. The extract is washed with 2 N-hydrochloric acid, 2 N-sodium carbonate solution and water in turn, dried over anhydrous sodium sulfate and evaporated under reduced pressure to give 172.6 mg. of residue. The residue is chromatographed on 8 g. of neutral alumina and from eluates with petroleum ether-benzene (8:2–7:3) mixture is obtained 76.8 mg. of dl-3α-acetyloxy-16-acetyl-5β-androsta-9(11), 16-diene melting at 113–115° C. by crystallizing from ether-pentane mixture. Recrystallization from ether-pentane mixture gives pure product melting at 116–117° C. as fine needles. U.V. (EtOH): 206 mµ (ε 4,730); 238 mµ (ε 9,690). I.R. (CS₂): 1728, 1660, 1238 cm.⁻¹.

*Analysis.*—Calcd. for $C_{23}H_{32}O_3$ (356.49): C, 77.49; H, 9.05. Found: C, 77.76; H, 9.22.

*Example 20*

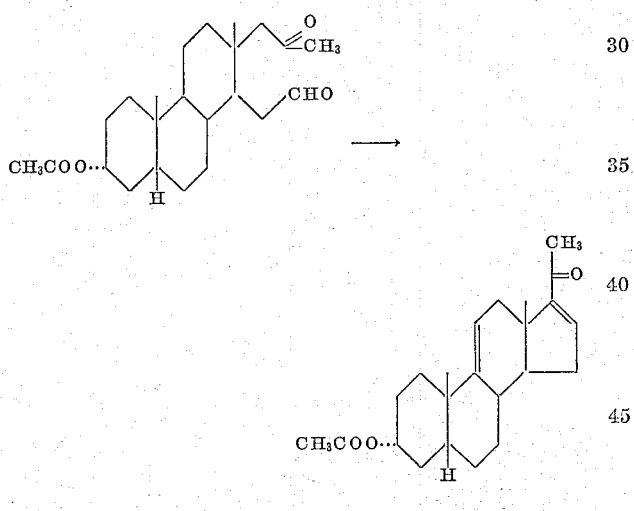

To a solution of 100 mg. of oily dl-3α-acetyloxy-17-acetyl-16,17-seco-5β-androsta-9(11)-en-16-al in 2.5 ml. of xylene is added 2.5 ml. of the xylene mixture prepared in the Example 19 and the mixture is sealed under 0.6 mm. Hg pressure. Then, sealed tube is heated for 8 hours in a boiling xylene bath. Treating the mixture in the similar manner as in the Example 19, 94.2 mg. of residue is obtained. The residue is chromatographed on 4 g. of neutral alumina and from eluates with petroleum ether-benzene (8:2–7:3) mixture is obtained 19.6 mg. of dl-3α-acetyloxy-5β-pregna-9(11),16-dien-20-one by recrystallization from ether-pentane mixture or methanol. A further recrystallization from methanol or ether-pentane mixture gives pure product melting at 153–155° C. as fine columns. U.V. (EtOH): 206 mµ (ε 4,880), 238 mµ (ε 6,960). I.R. (CS₂): 1725, 1660, 1240 cm.⁻¹.

*Analysis.*—Calcd. for $C_{23}H_{32}O_3$ (356.49): C, 77.49; H, 9.05. Found: C, 76.75; H, 9.15.

Of the compounds hereinbefore specifically set forth, the compounds having a ketalized oxo radical and/or an acylated hydroxyl radical can be deketalized and/or deacylated in a conventional manner to give the corresponding free oxo and/or hydroxyl compounds.

I claim:
1. A compound of the formula:

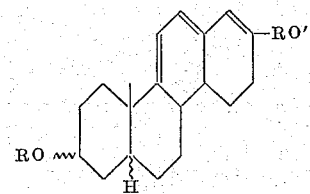

wherein R is a lower alkanoyl group and R' is a lower alkyl group.

2. 3α - acetyloxy - 17 - ethoxy - D - homo - 18 - nor-5β-androsta-9(11),12,17-triene.

3. A compound of the formula:

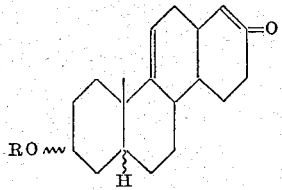

wherein R is a lower alkanoyl group.

4. 3α - acetyloxy - D - homo - 18 - nor - 5β - androsta-9(11),13(17a)-dien-17-one.

5. A compound of the formula:

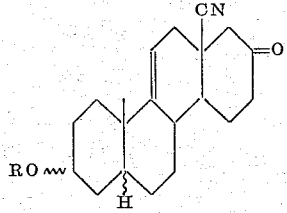

wherein R is a lower alkanoyl group.

6. 3α-acetyloxy-17-oxo-D-homo-5β-androst-9(11)-ene-18-nitrile.

7. A compound of the formula:

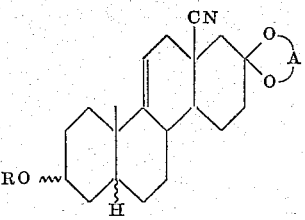

wherein R is a lower alkanoyl group and A is a lower alkylene group.

8. 3α-acetyloxy - 17,17 - ethylenedioxy-D-homo-5β-androst-9(11)-ene-18-nitrile.

9. A compound of the formula:

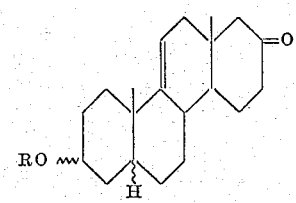

wherein R is a lower alkanoyl group.

10. 3α-acetyloxy-D-homo-5β-androst-9(11)-en-17-one.

11. A compound of the formula:

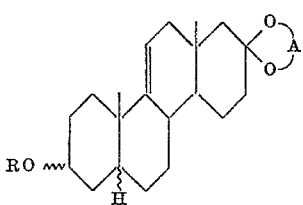

wherein R is a lower alkanoyl group and A is a lower alkylene group.

12. 3α-acetyloxy - 17,17-ethylenedioxy-D-homo-5β-androst-9(11)-ene.

13. A compound of the formula:

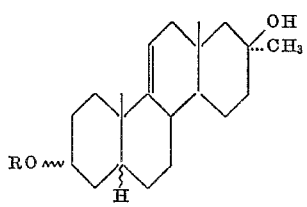

wherein R is a lower alkanoyl group.

14. 3α-acetyloxy - 17α-methyl - D - homo - 5β-androst-9(11)-en-17β-ol.

15. A compound of the formula:

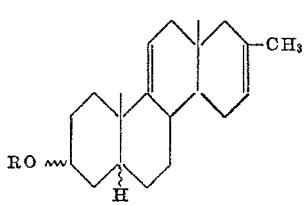

wherein R is a lower alkanoyl group.

16. 3α-acetyloxy-17-methyl-D-homo-5β-androsta-9(11),16-diene.

17. A compound of the formula:

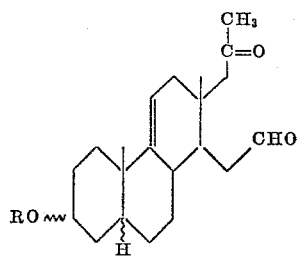

wherein R is a lower alkanoyl group.

18. 3α-acetyloxy-17-acetyl - 16,17 - seco-5β-androsta-9(11)-en-16-al.

References Cited by the Examiner

UNITED STATES PATENTS 3,024,271   3/62   Amiard et al. ____ 260—340.9 XR

OTHER REFERENCES

Karrer, Org. Chem., 2nd edition, pages 92–102 (1946).

WALTER A. MODANCE, *Primary Examiner.*

NICHOLAS S. RIZZO, *Examiner.*